United States Patent [19]

Robinson et al.

[11] Patent Number: 5,237,691
[45] Date of Patent: Aug. 17, 1993

[54] METHOD AND APPARATUS FOR AUTOMATICALLY GENERATING PARALLEL PROGRAMS FROM USER-SPECIFIED BLOCK DIAGRAMS

[75] Inventors: Bethany Robinson, Belford; Binay Sugla, Aberdeen, both of N.J.

[73] Assignee: AT&T Bell Laboratories, Murray Hill, N.J.

[21] Appl. No.: 561,391

[22] Filed: Aug. 1, 1990

[51] Int. Cl.⁵ .................. G06F 15/20; G06F 15/60; G06F 15/40; G06F 9/44

[52] U.S. Cl. ...................... 395/700; 364/DIG. 1; 364/280; 364/280.1; 364/282.1; 364/237.2

[58] Field of Search ............. 395/275, 700, 135, 155, 395/120; 434/118; 340/721; 364/DIG. 1

[56] References Cited

U.S. PATENT DOCUMENTS

| | | | |
|---|---|---|---|
| 4,827,404 | 5/1989 | Barstow et al. | 364/200 |
| 4,860,204 | 8/1989 | Gendron et al. | 364/300 |
| 4,866,610 | 9/1989 | Reiners | 364/300 |
| 4,872,167 | 10/1989 | Maezawa et al. | 371/19 |
| 4,885,717 | 12/1989 | Beck et al. | 364/900 |
| 5,041,992 | 8/1991 | Cunningham et al. | 395/135 |

Primary Examiner—Kevin A. Kriess
Assistant Examiner—Kevin Spivak
Attorney, Agent, or Firm—J. A. Caccuro

[57] ABSTRACT

Apparatus and method are disclosed for automatically generating computer programs for use in parallel processor arrangements from a user generated block diagram of the program. The system includes a library of parallel program modules and parallel program interface modules, a background manager (glue), a virtual shared memory, and a visual programming interface. Using the visual programming interface, the user selects parallel program modules and program interface modules and specifies operating characteristics information required to implement a block diagram of the desired program. The user then enables the system to create the source program, compile the program and execute the program on the system. The glue manager automatically establishes the communication paths needed to provide communication between the program and interface modules.

29 Claims, 11 Drawing Sheets

FIG. 10 REORDERING OF DATA
CYCLIC
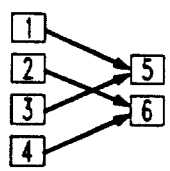
(A)
BUNCHED
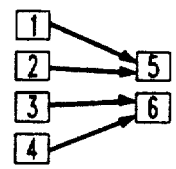
(B)
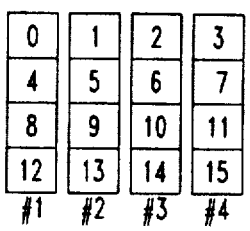
PROCESSOR #1 #2 #3 #4
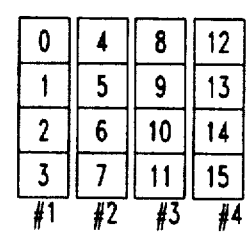
1 #2 #3 #4
(C)
FIG. 11 DATA TRANSFER
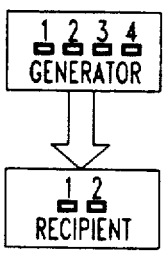
(A)
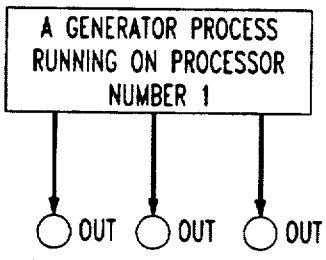
SPEAKER PORTS OF A
SINGLE GENERATOR PROCESS
(B)
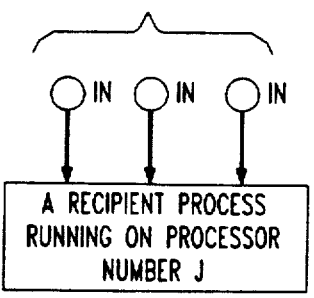
LISTENER PORTS OF A
SINGLE RECIPIENT PROCESS
(C)
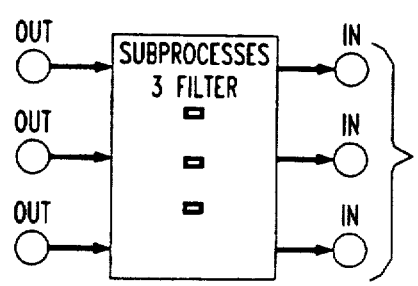
(D) LISTENER PORTS BELONGING
TO DIFFERENT SUBPROCESSES
OF THE SAME RECIPIENT
PARALLEL PROGRAM

FIG. 12

1202 — MASTER PROGRAM

1203
- COMPUTE COMMON INFORMATION RELEVANT TO THE GLUE INFORMATION STRUCTURES
- 
- 
-

1204

1205
DATAFORM STRUCTURE = SET (FLAGS, DATAFORM GLUE INFORMATION STRUCTURE, {NAME, ARGUMENTS});

ALGORITHM STRUCTURE = RUN (FLAGS, ALGORITHM, GLUE INFORMATION STRUCTURE, DATAFORMS, NAME, ARGUMENTS);

- 
-

1206
- SYNCHRONIZE THE APPLICATION'S ERROR AND EXIT STATUS

- AFTER THE SOURCE CODE FOR THE MASTER PROGRAM IS CREATED.
  THE COMPILATION PHASE PRECEEDS TO:

1207

(a) COMPILE THE MASTER PROGRAM
(b) JOIN THE MASTER PROGRAM TO:
   (i) PREVIOUSLY COMPILED (WITH GLUE LIBRARY AND OTHER STANDARD UTILITIES) ALGORITHMS REFERRED TO IN THE MASTER PROGRAM.
   (ii) PREVIOUSLY COMPILED (WITH GLUE LIBRARY AND OTHER STANDARD UTILITIES) DATAFORMS REFERRED TO IN THE MASTER PROGRAM.
   (iii) GLUE LIBRARY
   (iv) ANIMATION AND VISUALIZATION ROUTINES.

FIG. 16
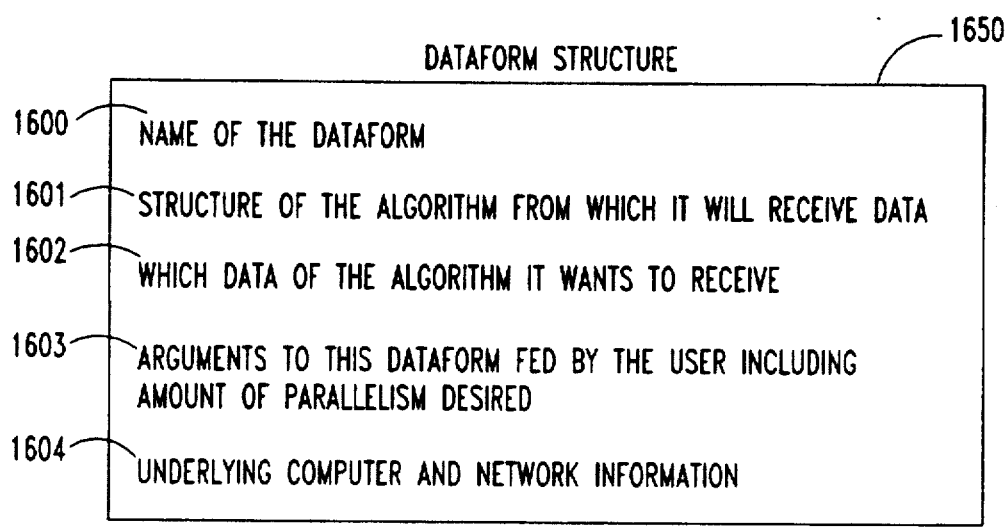
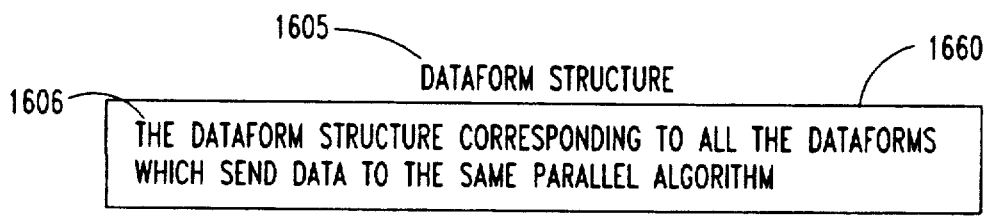
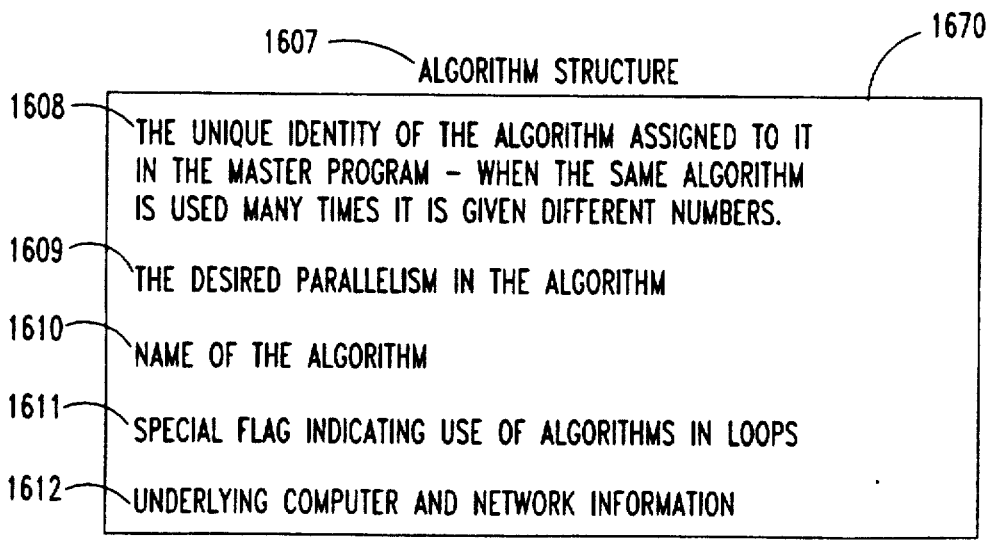

METHOD AND APPARATUS FOR AUTOMATICALLY GENERATING PARALLEL PROGRAMS FROM USER-SPECIFIED BLOCK DIAGRAMS

TECHNICAL FIELD

This invention relates to computer apparatus and, more particularly, to an apparatus and method for automatically generating parallel processor computer programs from user-provided block diagrams.

BACKGROUND OF THE INVENTION

The programming of large scale application programs for any computer machine is a time-consuming task. The programming of large scale application programs for parallel (concurrent) processors is especially difficult because the underlying parallelism forces algorithms and architectures to not only interact but also create new phenomena. There have been a number of program generation systems which have been designed and/or implemented to solve one or more facets of the parallel programming problem. Some of these systems address the algorithm mapping problem while others concern themselves primarily with the language issues in expressing an arbitrary parallel program, possibly in a restricted domain. Some other efforts have introduced primitives which help in synchronizing communication between two parallel programs.

Notwithstanding these efforts, the generation of parallel programs for use in parallel processor systems remains a roadblock to the effective realization of the potential of parallel processing.

SUMMARY OF THE INVENTION

A parallel processor program generation method and apparatus, according to the invention, enables a system user (i.e., programmer) to generate application programs from predefined parallel program modules which are interfaced together using parallel program interface modules (hereinafter interface modules).

More particularly, the user selects a first number of parallel program modules from a group of predefined parallel program modules, each selected program module having a user-defined data structure. The parallel program modules may, illustratively, include previously stored algorithms and previously composed programs. The user also selects a second number of interface modules, each selected interface module being arranged to receive and transform the structure of input data from at most one selected program module into an output data structure for output to at most one selected program module. Each interface module may include a "dataform" module for transforming data structures and a "Glue" routine, which manages inter-module communications. The user may specify operating characteristics information for further defining the function(s) to be performed by, the number of processors utilized by (parallelism factor), and the data type to be utilized by the selected program modules. The user may also specify information for defining operating characteristics of each dataform module, such as the number of processors utilized in the dataform module (parallelism factor) and the transformation function for transforming the input data structure into an output data structure. After the user has finished selecting, arranging and specifying characteristics of the program module(s) and interface modules(s), the system generates the program code for the desired application program.

An additional feature enables the user to create an algorithm or a dataform module to be used in the application program. Other features enable the user to select input, output, file access and memory access types of dataform modules for use in an application program. Yet another feature enables the user to select one or more evaluation tools to evaluate the application program.

BRIEF DESCRIPTION OF THE DRAWING

In the drawing:

FIG. 10 shows illustrative examples of data transformation functions provided by dataforms;

FIG. 11 shows illustrative examples of data transfer functions provided by dataforms;

FIG. 12 shows an illustrative master source program generated by the present invention in response to the user performance of steps 410-422 of FIG. 4;

FIG. 16 shows illustrative information structures for an algorithm and two dataforms.

GENERAL DESCRIPTION

It is well recognized that a major impediment to the widespread use of large-scale general purpose parallel processing is the tremendous effort involved in writing and implementing parallel (concurrent) application programs. This difficulty is compounded by the need to redesign the application programs when adopting the programs for differing processor architectures. The present invention deals explicitly with the issue of extraction of the parallelism by describing an application programming methodology. It also deals with the issue of expression of parallelism by providing primitives which facilitate the programming of a large concurrent application program.

Before describing the present invention, it may be helpful to generally describe the operation of an illustrative system in which the present invention may be utilized. It should be recognized that the present invention may also be utilized in other similar type systems or as a stand-alone system. Since such systems utilize a variety of hardware and programming techniques, no attempt is made to describe the operation of any system in which the present invention may be utilized. However, the present invention should be blended into the overall program structure of the system in which it is used and should be tailored to mesh with other features and operations of the system. Thus, in order to avoid confusion and in order to enable those skilled in the art to practice the claimed invention, this specification will describe the operation of the present invention using flow charts and data structures which describe the logical steps and the various parameters required to implement the invention.

Figure 1:
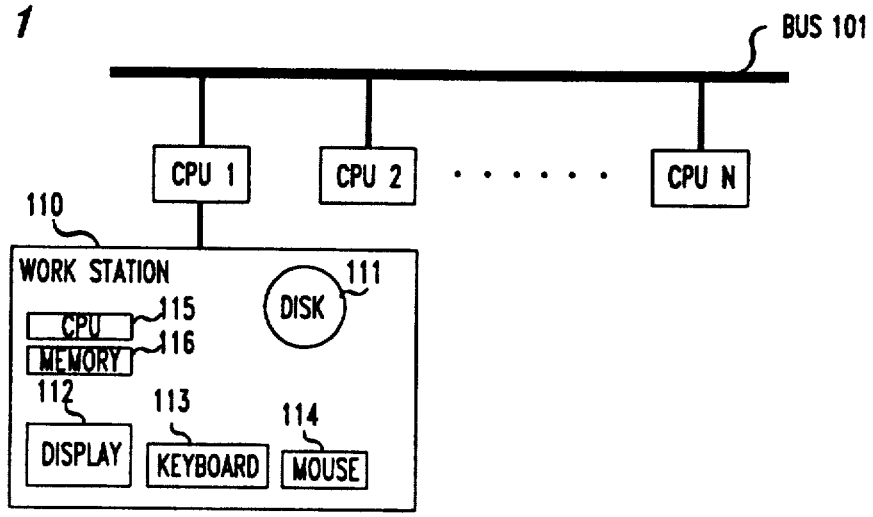
FIG. 1 illustrates a system useful in describing the operation of the present invention.

The system apparatus of FIG. 1 may, illustratively, be part of a telecommunication system, computer system or other system environment. The system may include a plurality of Central Processing Units (CPU) CPU1-CPUN which may be inter-connected via a local area network (LAN) or bus 101. The LAN or bus 101 may be implemented utilizing well-known configurations. The CPUs may all be of the same type or may be different types. The operating system of the CPUs may either be the same or different.

The operating system which comes with the hardware of FIG. 1, also called the resource manager processor of a computer network, is assumed to provide:

(1) Multitasking capability.
(2) A mechanism to permit interprocess communication.
(3) A scheduler which maps processes to processors. This may interact with an optionally-provided system scheduler.
(4) Shared memory within a CPU. For example, CPU 1 in FIG. 1 may let several processes on CPU 1 refer to the same segments of memory (116).

The CPUs may, themselves, also be part of personal computers or workstations such as, for example, a SUN Corporation workstation. The CPUs operating under program control may be arranged to operate together as a distributed processor system, as a parallel processing system or as a sequential processing system. The system program which controls the operation of CPU1-CPUN may be generated, in accordance with the present invention, on the system of FIG. 1. As an illustrative example, we assume that workstation 110 and CPU1 are used to generate computer programs in accordance with the present invention. Workstation 110, illustratively, includes CPU 115, memory 116, disk 111, display 112, keyboard 113, and mouse 114. The user operates workstation 110 in a well-known manner to receive output therefrom and to enter inputs thereto.

Figure 2:
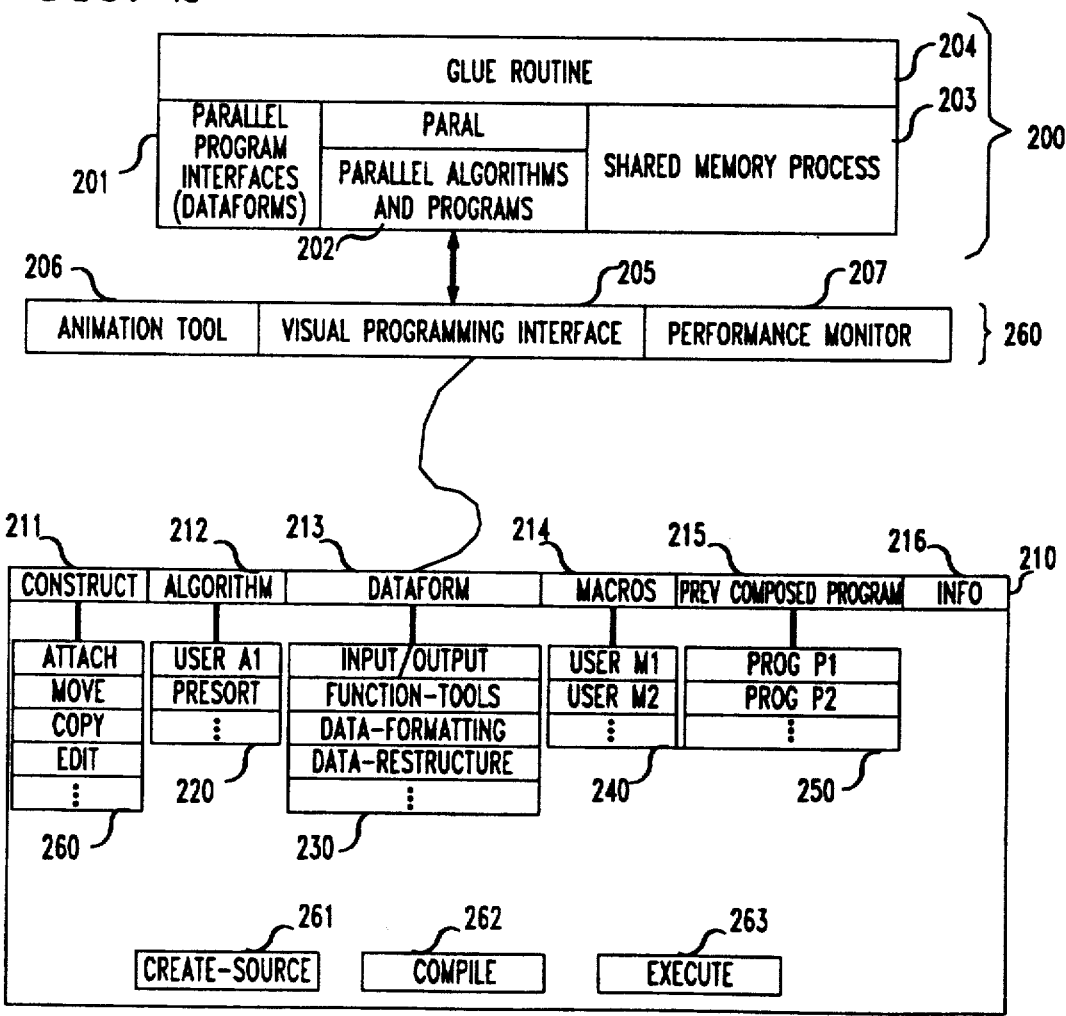
FIG. 2 shows an overall block diagram of the programming architecture.

In accordance with the present invention, as illustratively shown in FIG. 2, the system programming architecture includes a group of subsystems or blocks, such as a library of parallel algorithms and previously composed programs (PARAL) 202, a collection of interface modules (e.g., dataforms) 201 and, optionally, a shared memory process 203 which interact under control of a background manager (Glue Routines) 204.

In the description that follows, it should be understood that a "previously composed program" may contain one or more algorithms and dataforms and associated Glue Routines for managing the communication paths therebetween. Other than this difference, the user interaction in defining or executing either a previously composed program or an algorithm module is the same. Thus, when we describe the operation of an algorithm module, it should be understood that a previously composed program could also have some functionality, and vice-versa.

As previously noted, an interface module includes a user-defined dataform (possibly a "null" dataform) and a system generated Glue Routine which manages the dataform to algorithm communications. Note, the previously composed program algorithm or dataforms may be stored as source code or as compiled (i.e., object) code.

The algorithms 202, dataforms 201, shared memory 203 and Glue Routine 204 subsystems or blocks may execute on workstation 110 and/or one or more of the CPUs (CPU1-CPUN) of FIG. 1. User access to the programming system is via a graphics interface 260 which includes a visual programming interace 205, a performance visualization tool module (e.g., animation 206), and performance monitoring tool module 207.

The following paragraphs briefly describe the operation of the visual programming interface 205 which is used to assist the user (i.e., the programmer) in generating his or her desired application program. The description of the visual interface 205 is for illustrative purposes, other well-known visual interfaces which perform comparable functions may be utilized without affecting the overall operation of the present invention. Basically, the visual interface 205 provides the user with the capability to graphically generate an application program using, for the most part, standard or predefined blocks (also referred to herein as modules) of source code rather than requiring the user to write code from scratch. Thus, instead of writing code, the user manipulates or arranges the existing blocks of code to implement his/her desired application program. These blocks represent algorithms and dataforms; they are connected by lines or arcs drawn to form parallel data channels (e.g., see FIG. 3). Arbitrary pieces of code and subroutines may also be constructed and assembled visually. Blocks may also be gathered into a single macro block. A macro block may conversely be expanded into its individual members. An entire programming session may be stored and fetched at will. This then allows entire application programs to be treated as a single macro block and used in the construction of larger application programs.

The visual interface 205 provides a menu of tools and supplies 210, each referred to herein as a button, which can be accessed by the user. The supplies, illustratively, include a library of algorithms 212, dataforms 213, macros 214, previously constructed programs 215, etc. When any of the supply buttons 212-215 is "clicked on" or selected by the user, a menu or library for the selected button is displayed to the user. For example, when the algorithm button 212 is selected, the user is presented with a menu 220 of available algorithms. When the dataform button 213 is selected, a menu 230 of the names of available dataforms is displayed. Similarly, macros 214 and previously constructed programs 215 can be selected to display their menus (list of names), respectively, 240 and 250.

The tools of the visual interface 205 include the construct button 211 and the information button 216. Selecting construct button 211 displays a menu of functions 250 which are used to construct or rearrange the user's program. Selecting the information button 216 permits the user to access information about any of the buttons 211-215. The TTYIN (e.g., see 300 of FIG. 3) accepts input from the workstation 110 and distributes it to the concurrent subprocesses of the parallel algorithm. The TTYOUT (e.g., 308 of FIG. 3) on the other hand collects the various streams of data from an algorithm and sends it to the workstation 110.

In our example, we assume workstation 110 of FIG. 1 (e.g., a SUN workstation) is primarily responsible for running most of the graphics related tasks 205-207, while the program and the other associated routines 200 run on CPU1, illustratively, multiprocessor. The HPC multiprocessor is, illustratively, implemented using message-passing multiprocessor CPU1-CPUN.

Dataforms subsystem 201 provides a basic set of data transformation routines which can be used to transform data to or from the form needed by an algorithm. As noted, algorithm subsystem 202 provides a set of parallel algorithms. In addition, the user may specify arbitrary pieces of code and sequential routines (denoted as systems programs in 202) to construct a new parallel algorithm. Very briefly, to generate an application program, the user selects algorithms, dataforms, macros and previous programs from the appropriate libraries 230-250, or generates new ones and then arranges or interconnects them, using construct tools 210, to create the desired application program. Glue subsystem 204 permits the users to run a parallel algorithm, specify a dataform and "interconnect" or arrange these building blocks. Thus, a user may draw a parallel application instead of writing one. Moreover, because each part of the system is modular. Useful routines can continually be added to algorithm subsystem 202 or dataform subsystem 201. All of the system code that has been implemented on workstation 110 may accept input from other computing devices with little modification.

The present invention is an application programming environment which provides a set of subsystem (utilities) which the user (i.e., programmer) can use to simplify and speed the process of writing large-scale parallel application programs. Any parallelization of a large scale application program entails the use of simpler application programs. Therefore, the present invention provides the user with a set of utilities, e.g., Glue Routines, Dataforms and Shared Memory which assist the user in combining or arranging several parallel applications to form larger ones. The user may then optimize the running time of their applications by allocating different numbers of processors to various subapplications. This may be specified by a user through the visual programming interface, or alternatively the system can allocate based on its information about previous runs of the program.

To assist users in monitoring and controlling the performance of their applications, profiling tools or mechanisms such as performance monitor 207 and animation tool 206 are also provided. The present invention enables system level support for combining parallel programs. The use of these primitives enables the system user to realize many different subsystems (of the parallel environment) efficiently and quickly. The present invention permits a user (application programmer) to implement a large-scale application in a reasonable amount of time.

After the user has visually specified the program, the create-source button 261 enables the system to generate the source code for the master program. The compile button 262 enables the user to then compile the master program source code. Finally, the execute button 263 enables the user to run the program.

Generating an Application Program

Figure 3:
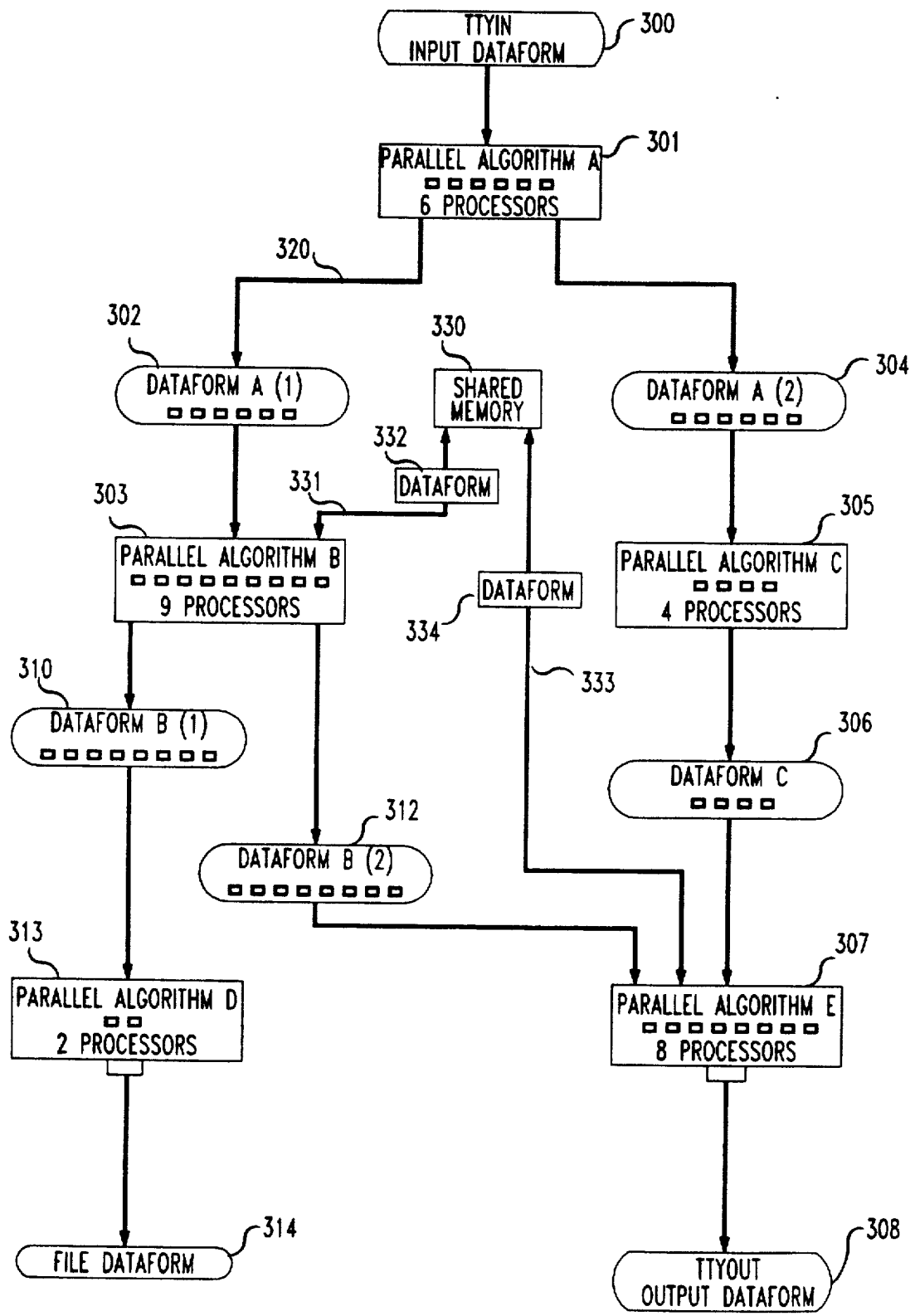
FIG. 3 shows, in graphical form, an illustrative user-generated application program in accordance with the present invention.

With reference to FIG. 3, we describe how the system of FIG. 1 is used to generate an application program from a user-specified block diagram of an application program. Generally, there are several different issues which arise in the programming of applications vis-a-vis algorithms. One outstanding difference is the complexity of the problem. An algorithm is usually associated with performing a very clearly-defined goal-oriented task. An application program on the other hand, typically uses many of these algorithms in the context of its domain specific information.

First, consider the illustrative application program of FIG. 3 and its decomposition in terms of the parallel algorithms (or algorithm modules) A, B, C, D and E as shown, respectively, in blocks 301, 303, 305, 307 and 313. Assume algorithm A, i.e., block 301, accepts its input from TTYIN terminal, 300, and runs on 6 processors. The output of algorithm A, 301, is needed by the two parallel algorithms B and C, 303 and 304, running on 9 and 4 processors respectively. The output of algorithm, B, 303, goes to the two parallel algorithms D and E, 313 and 307, running on 2 and 10 processors, respectively. Meanwhile algorithm E, 307, takes its input from two algorithms B and C, 303 and 305.

The oval shaped blocks in the flow chart of FIG. 1 represent data transformation routines. These data transformation routines (dataforms or dataform modules) take care of the distributing and restructuring of distributed data efficiently. Thus, in FIG. 3, the dataforms A(1), A(2), B(1), B(2) C, shown as 302, 304, 306 310 and 312, respectively, render the transfer of data between the various parallel algorithms (A-E) meaningful. One or more algorithms (e.g., 303 and 307) may have access to a shared memory 330, via dataform modules 332 and 334, respectively.

The TTYIN block 300 represents an input dataform which defines the format of inputs to the program of FIG. 3. The TTYOUT block 308 represents an output dataform which defines the format of outputs from the program. The file block 314 represents a file dataform which defines the format of data transfers to a program memory or file.

From the flow chart is should be clear that we also need mechanisms to accomplish fan-in and fan-out of data taking into account the asynchronous nature of the data transfer and the different number of processors associated with each parallel algorithm. In accordance with the present invention, Glue Routine 204 is designed to respond to these naming and transfer needs and more. Glue routine 204 provides system calls which can be used to invoke and dynamically connect the algorithm and dataform blocks of different types. Given an explicit specification, it handles many of these chores transparently. Glue routine 204 plays the role of a background manager in charge of naming the processes, establishing communication among the blocks and facilitating the execution of the larger program. The methods that assist in carrying out all of these chores are described in subsequent paragraphs of the present application.

DETAILED DESCRIPTION

Figure 4:
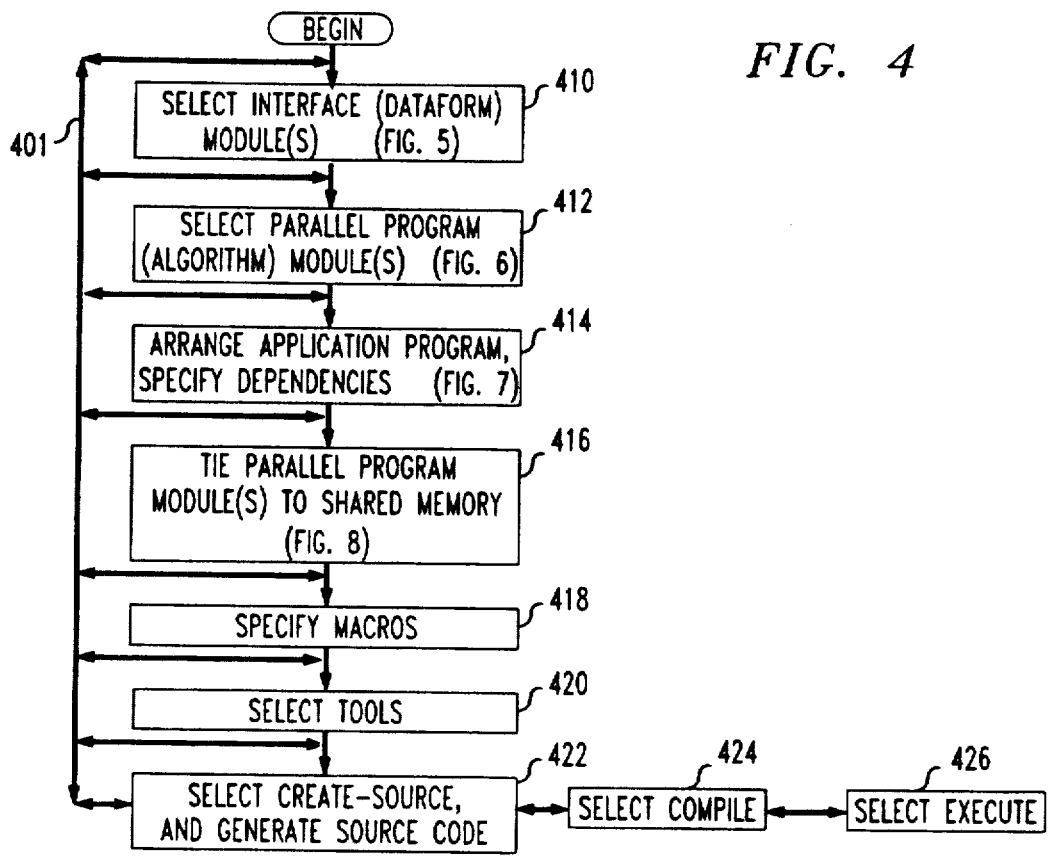
FIG. 4 shows a high level block diagram of the present invention.

In the following description when elements or blocks contain reference numbers, the first digit of that reference number designates the figure where that element or block is first illustrated (e.g., 401 is illustrated in FIG. 4).

With reference to FIGS. 4-8, we describe the overall program architecture of the present invention. In step 410 the user is presented a system menu on display 112 of workstation 110. The system menu includes a dataform button 213 which the user can "click" or operate to enter the dataform select subroutine of FIG. 5.

Figure 5:
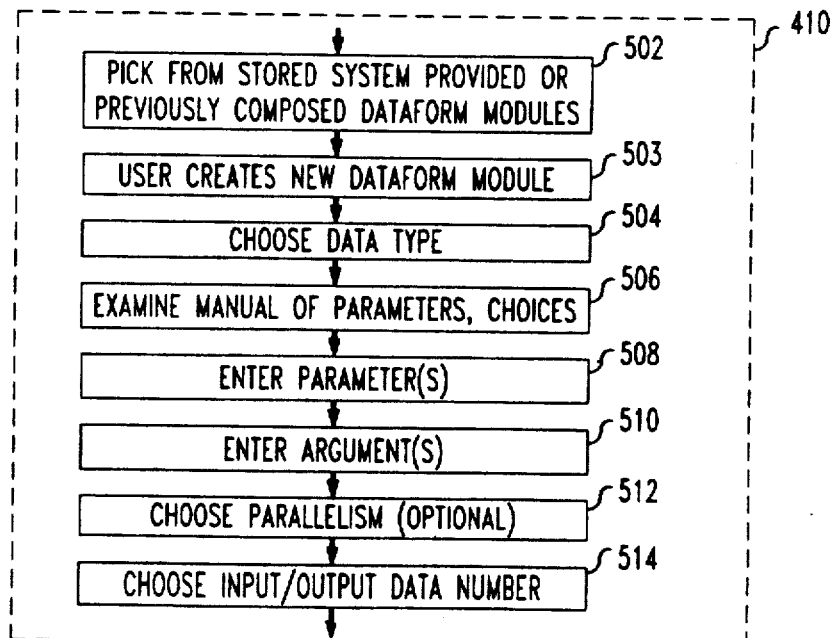
FIGS. 5-8 show a more detailed block diagram of specified blocks of FIG. 4.

Dataform Selection (FIG. 5)

According to the present invention, the system enables the transformation of distributed data in parallel. As mentioned before, the requirement of the transformation of data arises in the context of application programming in several natural ways. If the output of one program (referred to as generator) is sought by a recipient program which runs on a different number of processors—some notion of a distributing data according to a specified function of data must be developed. Obviously, there may be situations where there is no need for the dataform to transform the data, a so-called null dataform. There are other situations as well in which the data transformation routines play an important role. Most algorithms when implemented have a certain data structure implanted in them. When an attempt is made to interface two algorithms each utilizing a different underlying data structure, additional programming must be done. In the past, the lack of formalization of algorithm interfaces has resulted in a considerable amount of reprogramming and penalties in programmer time. The use of dataform routines, in accordance with the present invention, permits the programmer to re-use many existing algorithms with relatively small effort and to adopt their operating characteristics, if needed, to meet the needs of the particular application program.

Assuming that the user has operated the dataform button 402, then in step 502, the system presents the user with a dataform menu 230 including, illustratively, four basic groups of dataform functions or modules. One group of modules may define input and output functions and, illustratively, may include data file access (file in, file out) user input/output (TTYIN, TTYOUT). The TTYIN (e.g., see 300 of FIG. 3) accepts input from the workstation 110 and distributes it to the concurrent subprocesses of the parallel algorithm. The TTYOUT (e.g., 308 of FIG. 3) on the other hand collects the various streams of data from an algorithm and sends it to the workstation 110.

A second group may include functions which enable the operation of various system tools including for example, animation and performance.

A third group, illustratively, may include the movement and formatting of data structures (e.g., reordering of data to a processor). Shown in FIG. 10c is a column-to-row reordering of processor outputs.

A fourth group, illustratively, includes a data restructuring function which may map data into different group sizes. Some examples of data restructuring (or reordering of data) routines are shown in FIG. 10. FIG. 10a shows a cyclic mapping of data from four processors onto two and FIG. 10b shows bunched or many processors to one processor mapping (1002).

The user may select a system-provided dataform module or may also select a previously-composed dataform program or module which the user has stored in the dataform menu 230 of FIG. 2. The user may also create or construct a new dataform module, step 503, for the present application from one or more existing dataforms and then store this new dataform module in the dataform menu 230. When a new dataform module is created, the user provides the source code for implementing that new dataform module, whereas when an existing dataform module is selected the source code, is already available in the system.

For a dataform, the source of the data (typically an algorithm) is called a generator and the destination of the data (typically an algorithm) is called a recipient. The generator may include any number of processors (e.g., see algorithm A, 301) and the recipient may include the same or a different number of processors (e.g., algorithm B, 303). Note, the dataform which interfaces two algorithms (e.g., dataform A(1), 303) may also run on one or more processors (6 in the case of dataform A(1), 303). This removes a potential bottleneck in performance.

In step 504, the system requests that the user select the data type (or format) to be presented to the dataform. The data type may be, for example, integers, floating point, metric scale, etc. The data types are normally referred to the basic types offered by a language which are typically boolean, integers, floating points, characters and strings. The programming languages also offer a way of aggregating these data types into data structures via the use of (as in the C language) arrays, structures, and pointers. Any complicated data structure like a list, search tree, hash tables, etc., may be expressed by the use of these language primitives.

In step 506 the user examines a manual (or menu) of parameters associated with the selected or generated dataform. The user may specify, for example, the way the indices of the distributed data are numbered. If the dataform is performing a function to the data it may be necessary to enter the details of that function. For example, TTYOUT takes several streams of data (e.g., from the eight processors of algorithm 307 of FIG. 3), and merges the streams into one (for output from the application program of FIG. 3). This merging may be done randomly or in some defined order. Thus, the parameters, illustratively, are needed to specify attributes such as data mapping, data reordering, etc. Examples of data reordering as shown in FIG. 10. For example, if data resident on processors 1 to 4 is to be sent to processors 5 and 6 there are several mappings which can be defined—1, 2 to 5; 3, 4 to 6 (bunched) or 1, 3 to 5; 2, 4, to 6 (cyclic).

In step 508, the user enters the particular parameter values needed to specify the selected dataforms for the particular application.

In step 510, the system prompts the user to provide any arguments required by the dataform. The arguments are variables which depend on the particular application intended by the user. Arguments may, illustratively, include if a dataform, for example, filters out some of the values in a given stream of data it will need to know the criteria by which it will identify the data to be filtered. These criteria would be specified as arguments.

In step 512, the user may optionally be prompted to specify a parallelism factor which specifies the number of processors in the dataform and/or system. Note, typically the dataform is run as a separate process often requiring a different number of processors than the algorithm it receives data from. In that case it may have a different amount of parallelism (i.e., use a different number of processors) which should be selected by the user. Alternatively, the present system may force the dataform to run as a process running on the same set of processors as the algorithm it receives data from. In general, there can be several optimization criteria associated with the scheduling of the dataform including compaction of the dataform with the preceding or succeeding algorithm.

In step 514, the user selects the input/output data number. The data number of step 514 specifies the high level interface between the dataform and algorithms. Any algorithm has a number of input types and output types associated with it, each type is numbered differently with respect to that algorithm. A dataform therefore needs to know what output number it must be connected to. For example, an animation dataform will want to accept output from an algorithm which relates to the graphic output of the algorithm and not to the usual computed output. Whereas, a performance dataform may need to know the timing information and not the actual computed values of that algorithm.

The data number may comprise two groups of interfaces. One group is called a tool group and, illustratively, includes animation, graphics, debugging, performance, etc. type units. The other group is called intermediate group and includes those units which require intermediate outputs from the dataform. It should be noted that a dataform block may, itself, include recursive or hierarchical groups of other dataforms and algorithms. The specification of input and output data number enables the system, for example, to interconnect several algorithms output as inputs to a dataform, interconnect several algorithm inputs to a dataform output, etc.

After step 514 the user will have completed the specification for one dataform. Thus, using the program shown in FIG. 3 as an example, the user may have just completed dataform 302. If the user next desired to specify dataform 304, he or she would return to step 502 (via path 401 of FIG. 4). Otherwise, the user may choose to now specify one of the algorithms, e.g., 301 used in the program shown in FIG. 3.

Figure 6:
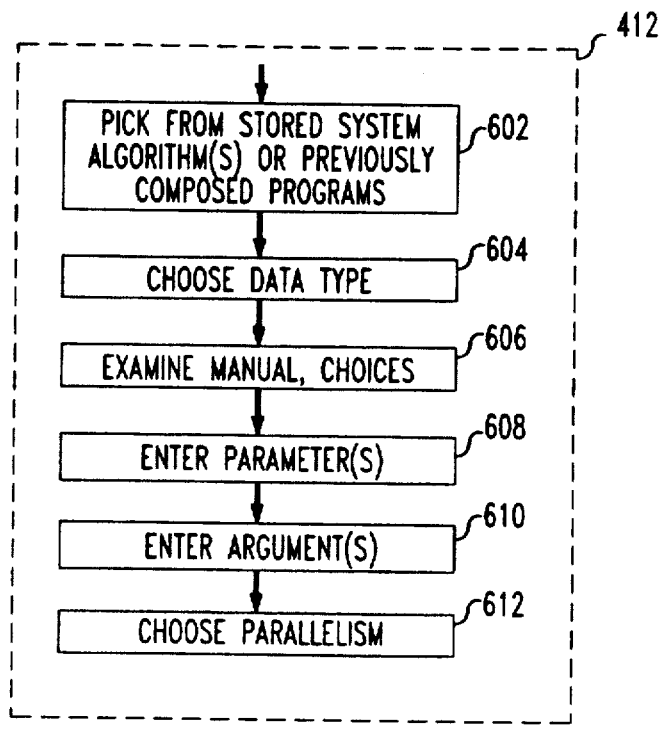

Algorithm Selection (FIG. 6)

To enable the user to select an algorithm e.g., 301, the system returns control to step 412. When the user clicks on the algorithm button 212, the system presents the user with the algorithm menu shown by 220 of FIG. 2. The menu of algorithms includes system-provided algorithms and those algorithms previously composed by the user. The system-provided algorithms may, illustratively, include the well-known algorithm such as sorting, merging, branch and bound, depth of search, intersection of objects, breadth of search, prefix, etc. The user may also click on the previous composed program button 215 which presents the user with a menu of previously composed programs 290. In step 602, the user can pick or select one of the algorithms from menu 220 or one of the previously-composed programs from menu 250. The subsequent steps 604 through 612 of the algorithm program select subroutine of FIG. 6 proceed in a similar manner to steps 504 through 512 previously described. The steps 604 through 612 enable the user to adopt the operating characteristics of the algorithm module to meet the needs of the particular application program. Note, because the dataform selection subroutine has specified in (step 514) the high level interface between the dataform and algorithm, there is no need for an equivalent step in the algorithm selection subroutine of FIG. 6.

After completing step 612, the user has completely specified the algorithm 301. The user may optionally select to specify another algorithm, e.g., 303 or perform other steps or subroutines specified in FIG. 4. Note, in accordance with the present invention the user can return to any subroutine from any other subroutines of FIG. 4 via path 401.

We now assume that the user has completed the selection of all the dataform and algorithms required for the illustrative program of FIG. 3. In such a case, in step 414 the system enables the user to compose or arrange the application program by specifying the dependencies between the algorithms and dataforms. That is, in step 414, the system provides the user the opportunity to specify communication interconnection parameters (e.g., path 320 of FIG. 3) between an algorithm 301 and a dataform 302.

Figure 7:
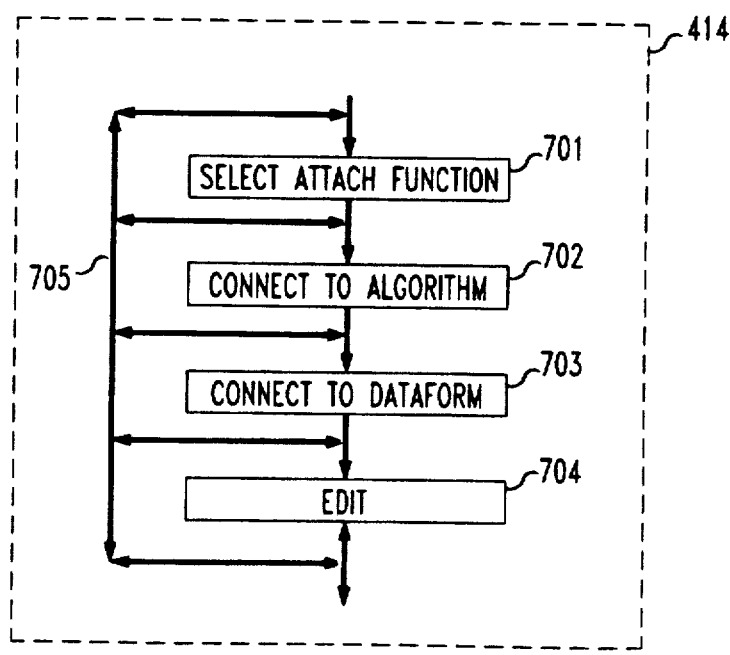

The subroutine FIG. 7 shows the steps the user must follow to arrange the application program. In step 701, the user selects the attach mode or function from the construct menu 260 using mouse 114. In steps 702 and 703, the user makes the desired connection, respectively, between algorithm(s) and dataform(s) of FIG. 3. This is accomplished by the user bringing the cursor to the algorithm block and clicking the mouse and then bringing the cursor to the dataform block and clicking the mouse. To completely specify these dependencies the user may need to provide various parameters (as previously described). The user repeats steps 702 and 703 to completely specify all dependencies of our illustrative program of FIG. 3. Once the user draws all of the connections between the dataforms and algorithm of FIG. 3, the system knows how to control dataflow in the proper format between the various dataforms and algorithms of the program. Thereafter, in step 704, the user may enter the edit mode to modify any of the previously-specified dependencies. The edit mode is entered by clicking the mouse on the edit button of the construct menu 260. The user is provided the option, 705, to return to any of the previous steps 701–703.

At the conclusion of step 414, the system proceeds to step 416. In step 416, if a shared memory capability is provided, the algorithms of the user-defined program of FIG. 3 are connected or tied to the shared memory. Illustratively, this is shown in FIG. 3 where the shared memory 330 is connected to algorithms 303, 305, 307 and 313, respectively, via paths 331, 332, 333 and 334. Note, a shared memory capability is provided for application programs by the system because it utilizes less data transfer operations, reduces duplication of valuable memory resources, and may improve system performance.

Figure 8:
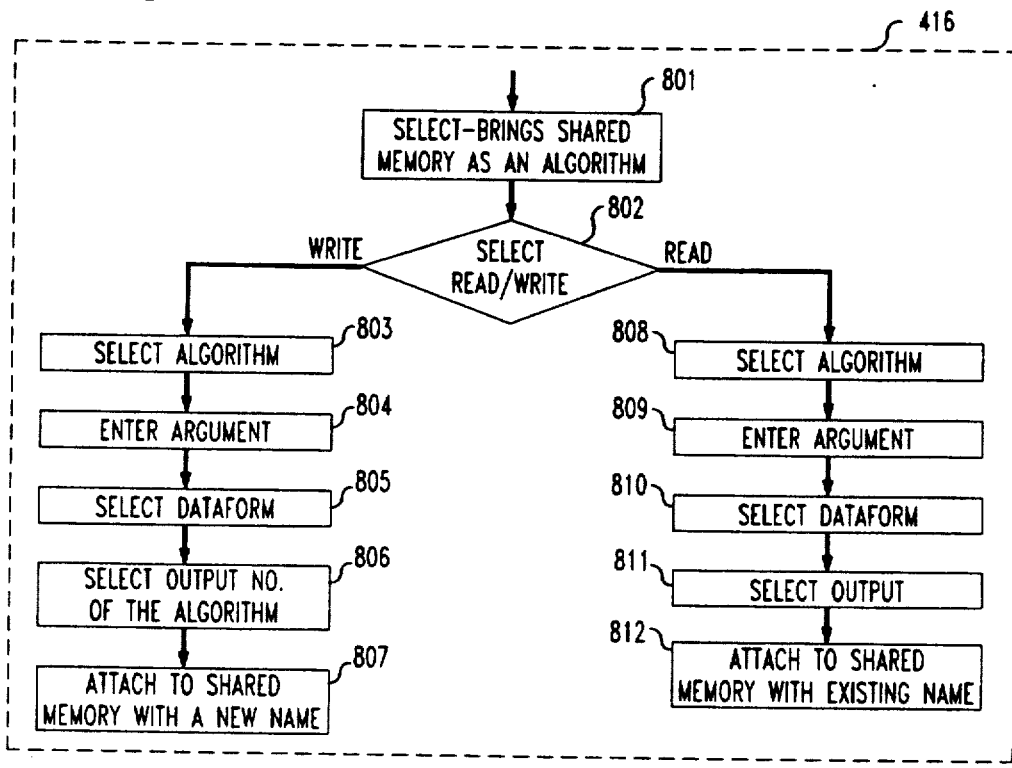

The details of the tie subroutine of step 416 is shown in the flow chart of FIG. 8. In step 801 the user selects the tie subroutine which defines the shared memory as an algorithm. In step 802, the user selects whether he or she presently is going to define a read or write access to the shared memory. Assuming that a write operation is desired, then in step 803 the user selects an algorithm (of the program of FIG. 3) which requires access to the shared memory.

In step 804, the user enters the arguments which are to be written from the selected algorithm to the shared memory. The algorithm needs to specify whether to read, write or both read/write arguments. The inputs in the algorithm are assumed to be read from the shared memory and the outputs written into the shared memory. If an argument is to be read from the shared memory there must be either (a) a variable of the same name being written into the shared memory or (b) an explicit connection is made to an already existing variable of a different name.

In step 805, the user selects a dataform to specify the data transfer between the selected algorithm and the shared memory. In step 806, the user selects an output number of the selected algorithms. Note, since each algorithm may have more than one output, the output number must uniquely specify the output requested. Finally, in step 807 the user activates the attach mode of construct menu 260 and attaches and names a path connection between the selected algorithm and the shared memory. A unique name is assigned to the connection so that it may be identified by the system or user during subsequent operations. For example, if a read operation (steps 808-812) is required by the same algorithm, then the same name of the connection can be identified to the system in step 812. Note, the steps 808-811 of the read access are specified and operate in the same manner as the equivalent steps 803-806 of the write access. The procedure described above, in steps 801-812, is repeated for each algorithm (e.g., 303, 305, 307 and 313) of FIG. 3 which requires access to shared memory 330.

After the shared memory access step 416 is completed, the system enables the user to specify macros in step 418. A macro is defined herein as a group of algorithms and dataforms. A macro facilitates a hierarchical representation of complex programs. The user may define a macro block by circling groups of algorithms and dataforms using mouse 114. Thus, for example, with reference to FIG. 3, the user may define a macro by encircling algorithm 313 and dataforms 310 and 312. To specify the macro, the user will need to name or identify the macro. The system then appropriately associates the parameters, argument, dependencies, etc., previously specified by the user for the algorithm 313 and dataforms 310 and 312 with the newly created macro.

After completing the macro specification step 418, the system enables the user to select from a menu of tools (206, 207) which can be utilized with our illustrative user-generated program of FIG. 3. An illustrative list of tools available to the user were specified in a prior paragraph. After selection of the tools, the user must specify to the system how and where the tools are to interface to the user-generated program. The semantics of the tools (except for shared memory) are exactly as that for any other algorithm and dataform and therefore the same rules and methodology are used for incorporating them into the application.

Thereafter, when the user has completed all of the prior steps, he or she can activate the create-source button in step 422. In response, the system generates a descriptor file which describes the user-generated program of FIG. 3. During step 422, the system Glue Routine 204 implements the detailed intercommunication connections between the algorithm and dataforms of the user-generated program of FIG. 3.

After the user has entered the visual representation of the illustrative program, as shown in FIG. 3, and has entered the arguments as per the conventions specified in FIGS. 4-8, the source program may be generated by the user clicking on the source create button (261 of FIG. 2) during step 422 of FIG. 4. This process is described in FIG. 12. With reference to FIG. 12, the source program is referred to therein as the master program 1202. The master program contains several parts numbered 1203, 1204, 1205 and 1206. The section 1203 computes several Glue information (e.g., dataform and algorithm), structures shown in 1204 and 1205, which are required by the processes that would execute in the system and will be described in greater detail below. The calls to the dataform-algorithm pairs e.g., 1204 and 1205 are typically repeated an arbitrary number of times to implement an application program. With reference to FIG. 3, such dataform-algorithm pairs include 300-301, 302-303 etc. Note, while the dataforms 308 and 314 actually are not paired to an algorithm, they are still implemented as a pair, but the flag in the algorithm 1205 will indicate that there is no actual algorithm.

Flags are used to denote special characteristics of a dataform-algorithm interaction and behavior. These characteristics include:

(i) Dataforms may not be accepting input from another algorithm (e.g., TTYIN 300 of FIG. 3);

(ii) Dataforms may not be sending output to an algorithm (e.g., TTYOUT 308 of FIG. 3, and also FILE DATAFORM 314 of FIG. 3);

(iii) Algorithm is interacting with a shared memory (e.g., 303, 331, 330 of FIG. 3);

(iv) A dataform algorithm-dataform forms a loop with the same algorithm (not shown). In other words, algorithm P may send output to algorithm Q via dataform R and at the same time accept as an input the output of algorithm Q via dataform S.

Glue Information Structure

Frequently, the communication mechanism provided by the operating system is a function of the CPU's where the two processes desiring to communicate are resident. The Glue information structure contains this CPU-dependent information about underlying communication mechanism.

If the previously described underlying operating system provides a homogeneous communication mechanism between two processes irrespective of their CPU execution site, then the Glue information structure may not be necessary. We now return to our master program 1202 description. The present system transverses the user-specified visual representation of an application program, e.g., FIG. 3, from top to bottom focusing on an algorithm module and all its input dataforms. These dataforms along with Glue information, their names and arguments are described in a dataform structure, illustratively shown in 902, are passed in a call to a routine called "SET" as shown in 1204. An algorithm structure, illustratively shown in 901, corresponding to the user-selected algorithm and containing the algorithm information and arguments is constructed and passed along with the above dataform structure 902 (step 426 of FIG. 4) to the routine called "RUN" in 1205. When the program is executed "RUN" is responsible for the actual creation of the processes. As previously noted, the calls shown in 1204 and 1205 are repeated until all the algorithms and the dataforms of FIG. 3 have been started. Finally, 1206 contains the calls required to synchronize the various processes generated by the program at run time (initiated when the user selects the execute button 263 of FIG. 2) and to monitor their status.

After the source code for the master program is created it may be compiled in step 424 of FIG. 4 by clicking the compile button (263 of FIG. 2). This step 424, referred to as 1207 in FIG. 12, performs the functions illustrated. The compiled master program is then ready for execution by clicking on the execute button (263 of FIG. 2) during step 426 of FIG. 4.

Figure 13:
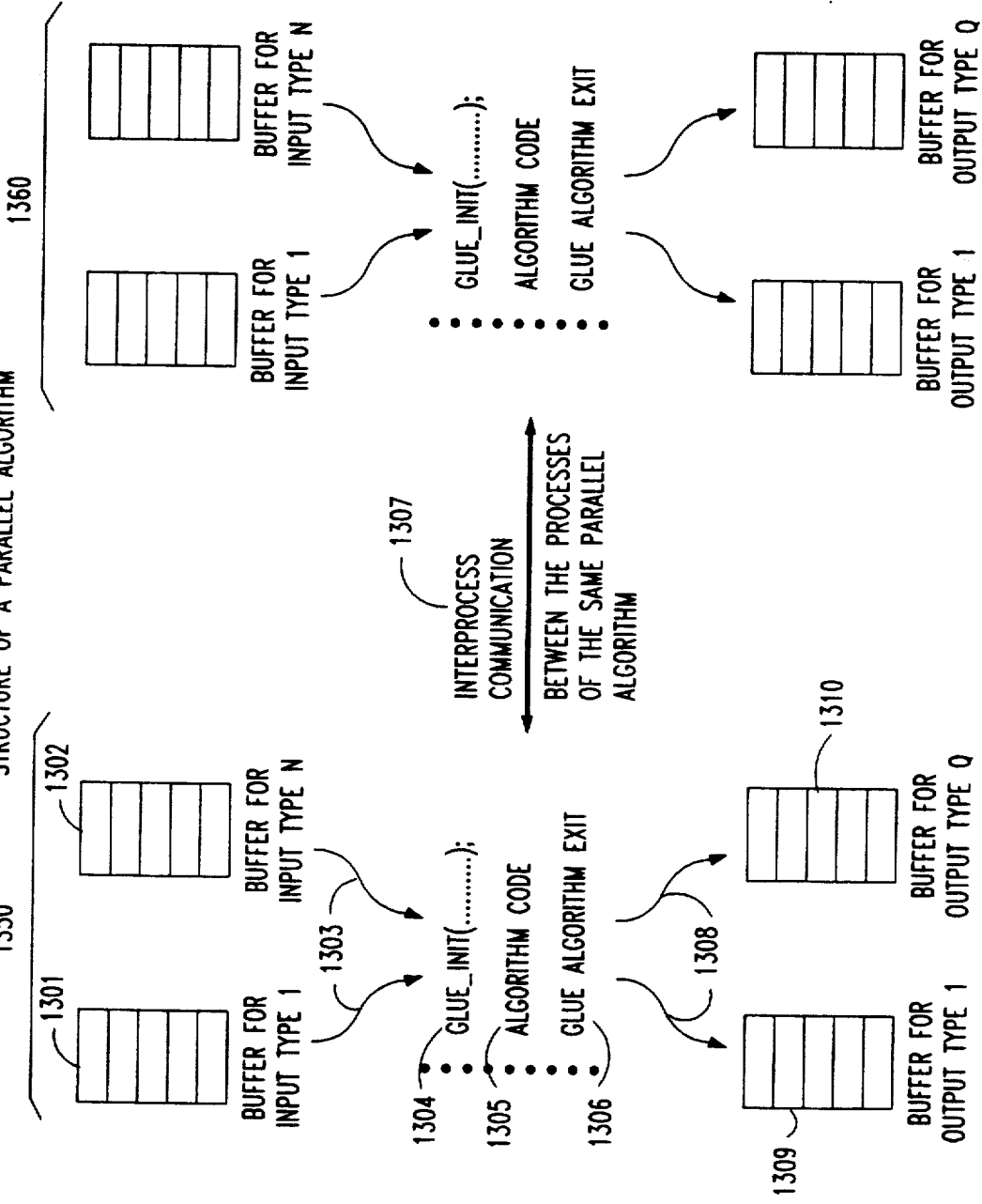
FIG. 13 shows the structure of a parallel algorithm as utilized in the present invention.
Figure 14:
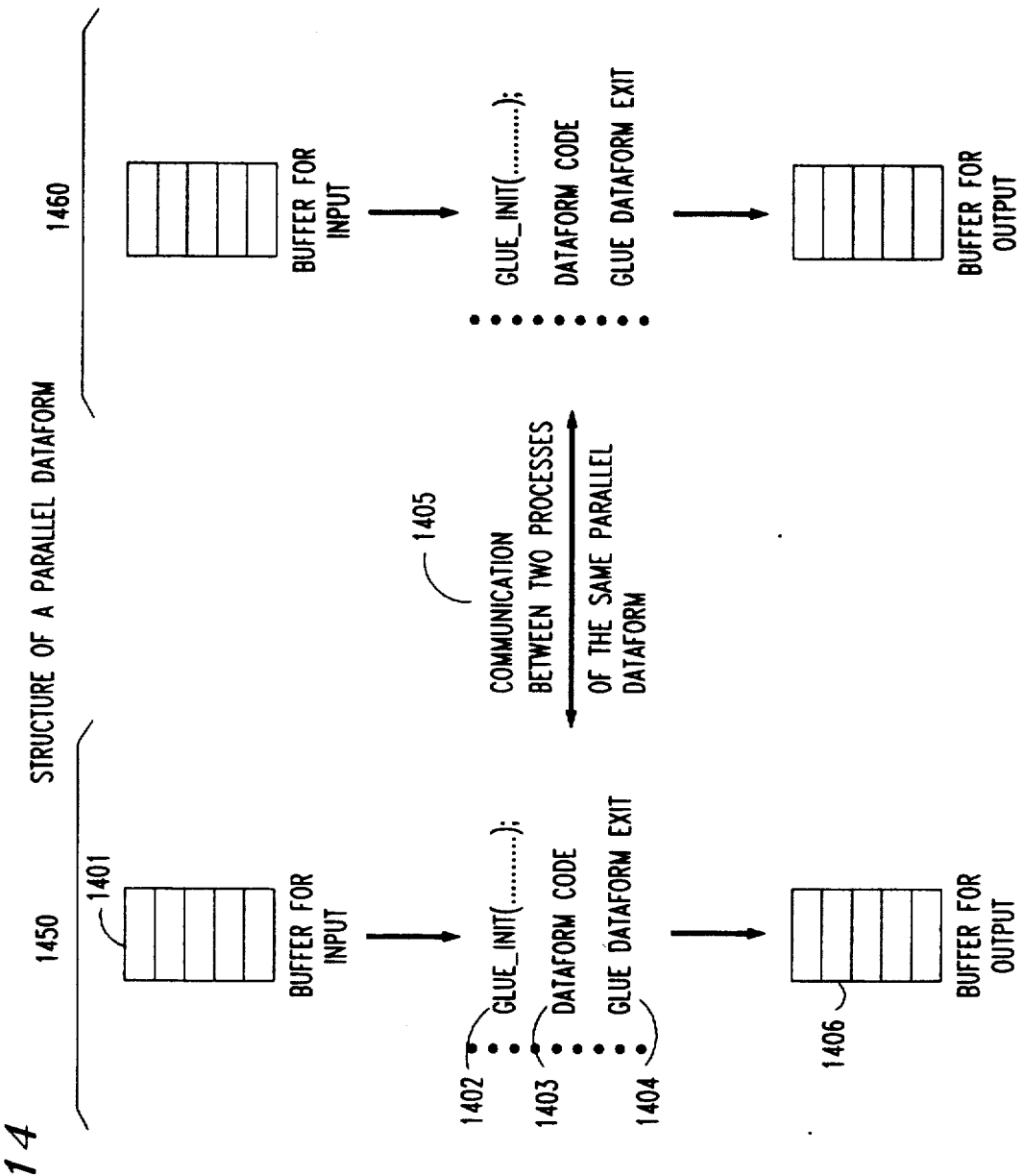
FIG. 14 shows the structure of a parallel dataform as utilized in the present invention.
Figure 15:
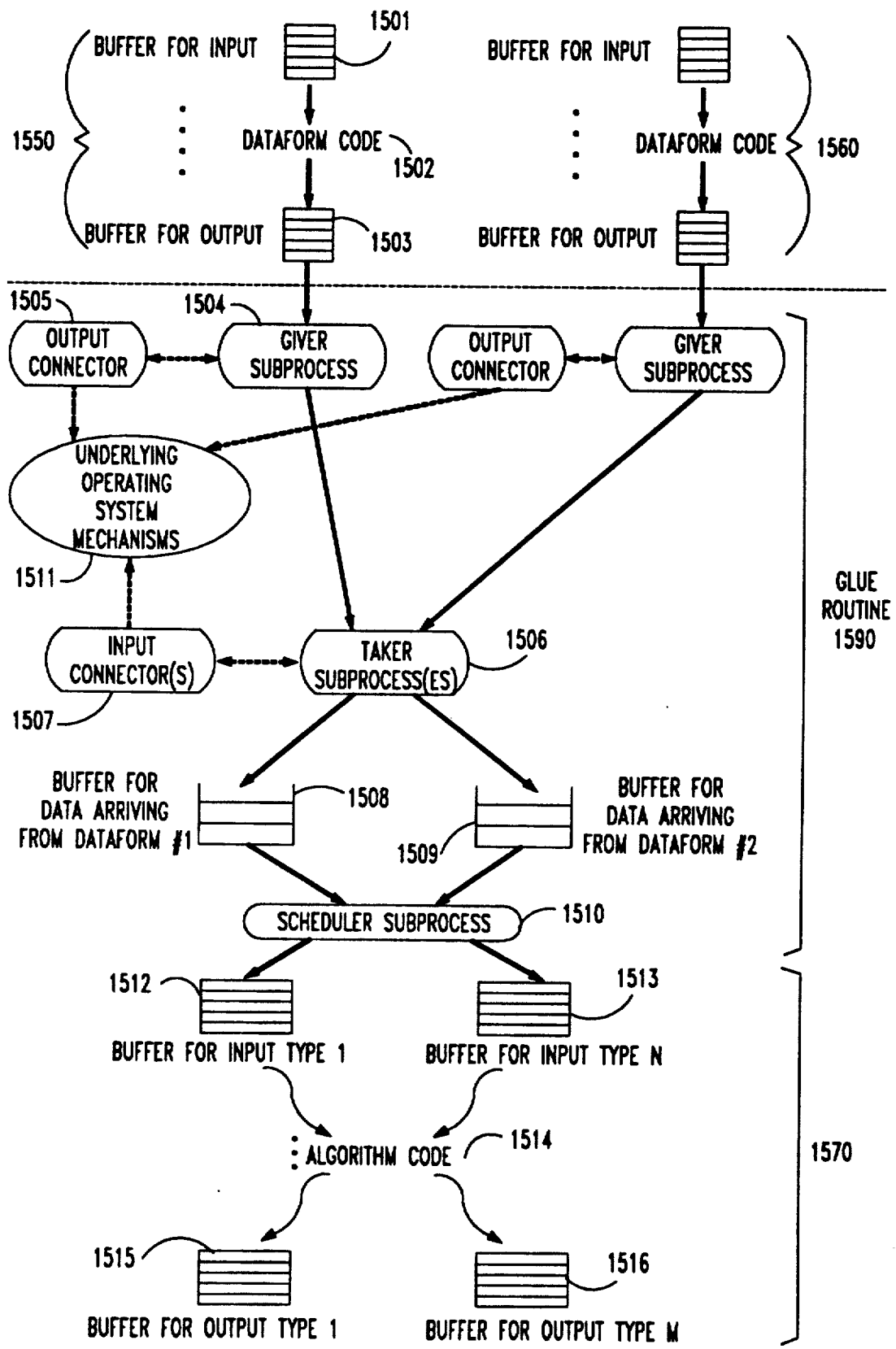
FIG. 15 shows an illustrative interaction between a dataform, an algorithm and Glue Routine during run-time.

In order to understand what happens when the master program is run and how the system realizes the already described functionalities, it is necessary to consider FIGS. 12, 14, 15 as well. FIG. 13 shows how a parallel algorithm for use in the present system is programmed. FIG. 13 shows a parallel algorithm including two concurrent components 1350, 1360. The path 1307 shows a possible interprocess communication between the two simultaneously executing components 1350 and 1360 of the same parallel algorithm. The parallel algorithm reads its N different kind of inputs from buffers 1 (1301) through N (1302). The path 1303 denotes the reading of the inputs. The input Glue_Init 1304 initializes Glue parameters necessary for communication between connecting dataform modules of FIG. 3 and utilizes the information passed to it by the "run" routine call 1205. With reference to FIG. 15, the Glue_Init also generates subprocesses 1506, 1507, 1510 and prepares buffers 1508, 1509. Returning to FIG. 13, item 1305 is the algorithm code. The Glue Algorithm Exit 1306 is used to communicate with the other subprocesses previously generated in 1304 and other components, e.g., 1360 of the same parallel algorithm. The path 1308 denotes the writing of the different kind of outputs 1 through Q of algorithm code 1305 to output buffers 1 (1309) through Q (1310).

FIG. 14 shows the way a dataform is programmed. It has one buffer for Input 1401 from which it reads the data. The input Glue_Init 1402 performs functions similar to 1304 of FIG. 13 with some differences reflecting that it is dataform. The Glue_Init 1402 generates subprocesses corresponding to the functions 1504, 1505 of FIG. 15. The dataform code 1404 is followed by Glue dataform exit 1404 which performs the same function as 1306 of FIG. 13. Again, the path 1405 shows interprocess communication between two simultaneously executing components 1450 and 1460.

Interactions Between Algorithm, Dataform and Glue During Run-Time

The run-time is initiated when the user presses the execute button 263. The run-time operation is described with reference to FIG. 15 and the associated data structures in FIG. 16. FIG. 15, illustratively, shows one concurrent subprocess of a parallel algorithm 1570 accepting inputs from one component each of two different dataforms 1550 and 1560. The references 1501, 1502, 1503 show a dataform 1550 sending an input to a component of a parallel algorithm 1570. The transfer function, Glue Routine 1590, between dataform 1550 and algorithm 1570 which utilizes subprocesses 1504–1510 is achieved transparently and automatically by the present system. The previously described Glue_Init 1402 generates the subprocesses 1504 and 1505. The Glue_Init exit 1304 generates subprocesses 1506 to 1510. The subprocesses 1505 and 1507 find each other by use of the Glue naming utilities and information as described in FIG. 16 and the underlying previously described operating system basic communication mechanism 1511. Once the communication channel is established, the Giver subprocess 1504 sends data as it becomes available in buffer 1503. The Taker subprocess 1506 takes data as it comes from dataform 1550 and puts it into buffers 1508 and 1509 (since there are two dataforms 1550 and 1560 as sources of data). The schedule subprocess 1510 mixes the data according to user specifications and separates data into different types of data into buffers 1512 and 1513. Note, the user can also specify no mixing. Since buffers 1508, 1509 1512, 1513 are accessed by more than one subprocess, they are actually shared buffers. The same is true for buffer 1503.

The algorithm 1570 then accesses buffers 1512 and 1513 and performs its computation accordingly and writes its output data in buffers 1514 and 1516.

The transfer from algorithm to dataform is established in a fashion analogous to the above-described transfer from dataform to algorithm.

FIG. 16 shows in greater detail illustrative data structures 1650, 1660 and 1670 containing the information which is constructed by the present system (for example, during steps 1204, 1205. This information is passed on to the algorithms and dataforms (for example, during transfer function 1590), received by algorithms and dataforms (for example via steps 1304 and 1402) and used to achieve the runtime capability as described in FIG. 15. Information item 1600 identifies the correct dataform to be loaded during execution. Buffer 1501 receives the right data by using item 1602 from the algorithm specified in 1601. Item 1603 ensures the correct and desired behavior of the dataform. Information items 1603, 1604 let output connector 1505 (i.e., item 906) enable taker subprocess 1506 and input connector 1507 to know the number of dataforms (i.e., 1550 and 1560) sending inputs to the algorithm (i.e., 1570) and allow the proper receipt of the data into buffers 1508, 1509. Information structure 1607 contains item 1608 which is used by the master program 1202 for monitoring purposes and used by 1601. Item 1609 specifies the desired parallelism in the algorithm and item 1610 specifies the name of the algorithm for loading during execution. Item 1611 identifies special loop usage of the algorithm as, for example, in a subroutine fashion, where the output goes back to the algorithm where the input came from. Item 1612 ensures proper interaction of input connector 1507 and Taker subprocess 1506 with output connector 1505 and Giver subprocess 1504.

Background Manager: Glue Routines

Figure 9:
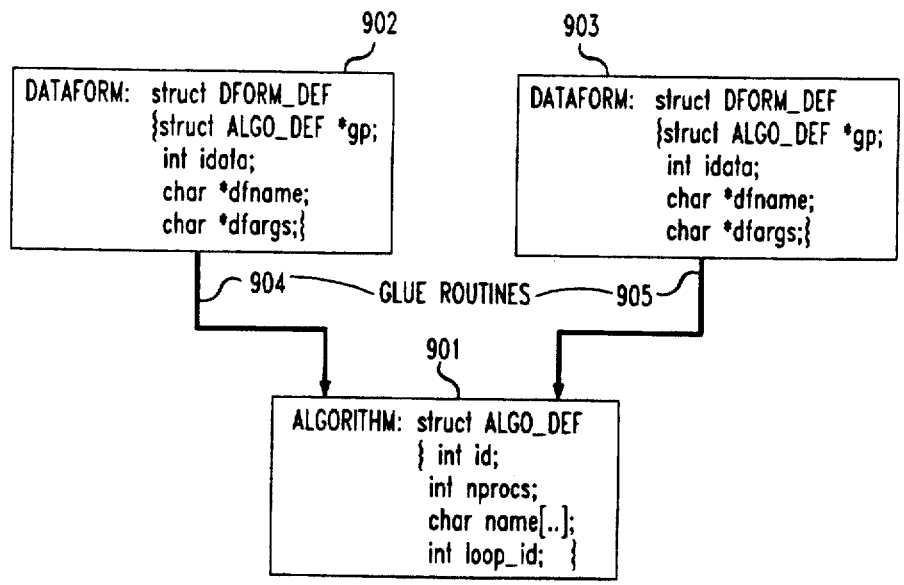
FIG. 9 shows an illustrative communication interaction between an algorithm and two dataforms.

With reference to FIG. 9, we, illustratively, describe the interaction between an algorithm, its dataforms, and the Glue Routines 904 and 905. Note, the following description would apply to each algorithm and dataform of our illustrative user-generated program shown in FIG. 3. Each dataform is described by a data structure (e.g., 902) which includes information to:
1. Identify numbers of the (zero or more) algorithms it takes its inputs from.
2. Identity number (idata) of the output of each of the corresponding algorithms from which the dataform takes its inputs.
3. Number of processors ($>1$) the dataform should run on.
4. Identify number of the (zero or more) algorithms to which it needs to send its outputs.
5. Identity number of the inputs of the algorithm to which the dataform may send data to.
6. Name of the dataform program (dfname).
7. Arguments of the dataform (dfargs) which need to be passed to the dataform program.
8. The "Glue" arguments which are passed on to the dataform to automate the functions of process communication and synchronization as described in the paragraph below.

Each algorithm (e.g., 901) maintains the following types of information:
1. A list which maintains the descriptors of all the dataforms from which the algorithm accepts its inputs as described above.
2. A list which maintains the descriptors of all the dataforms to which the algorithm sends its outputs as described above.
3. The name of the algorithm (chaname).

4. The amount of parallelism (nprocs) desired in the algorithm.
5. The arguments of the algorithm which need to be passed to the algorithm program.
6. The "Glue" arguments which are passed on to the dataform to automate the functions of process communication and synchronization are described below.

Note, some of the information (e.g., dataform items 1, 2, 4 and 5, and algorithm items 1 and 2) may be omitted if this information is passed into the algorithm in some implementations. The idea is that in order for an algorithm and dataform to communicate at least one of them must know the identity of the other. This can be accomplished by either requiring that the dataform, algorithm, or perhaps a combination of both, carry that information. It is a matter of implementation detail.

The Glue Routine is a subsystem which
1. Facilitates dynamic invocations of parallel algorithms and data transformation routines.
2. Provides automatic facilities for the interconnection of and the communication between various parallel programs. Thus, when a recipient algorithm wishes to receive data from the generator algorithm via a dataform, the Glue Routine provides the names and the location to the two processes. This information may then be used to open channels for data transfer.

The parallel algorithms are executed, in step 426, by the use of the run command (FIG. 12). The run command is used to execute a particular parallel algorithm, pass its arguments, and specify all of its generators and associated dataform routines. Thus, the recipient controls the specification of its generators. Once the connection between the two algorithms is established however, data is transferred when it becomes available at the generator. Conceptually, the Glue Routine associates speaker ports with the outputs and listening ports with the inputs of a parallel algorithm. The model of such a transfer is shown in FIG. 11. Some of the commands (in pseudo-code for convenience) are shown below:

(a) generator list=set dataform (TTYIN, argument list);
(b) algorithm=run (matrix multiply, argument list, number of processors, generator list);

Assume that the lines (a) and (b) appear in a program in the same order as shown above. (a) creates a template for a dataform TTYIN routine to handle input via UNIX ® Operating System on workstation 110. (b) starts up the parallel matrix multiplier algorithm on the specified number of processors and starts up the dataform routine as specified through generator list. The multiplier algorithm will get the input from workstation 110 through the dataform TTYIN as described in (a). The run command is responsible for invoking the algorithms explicitly and the associated dataforms implicitly. Using the Glue Routine semantics, an arbitrary number of dataforms routines may be associated with the input of any algorithm. Each of the algorithms may have a number of different data structures which may be individually selected for transmission. A parallel algorithm may therefore receive different inputs from more than one generator and send different outputs to more than one recipient (FIG. 11 A-D). Glue routines also support invocation of a parallel algorithm in a manner analogous to sequential subroutines and functions. A single thread executing on a processor may invoke a parallel algorithm which returns the results to the thread. This process is similar to a remote procedure call with a major difference. In the remote procedure call we execute a procedure on a different processor and then get the arguments back. Here the remote procedure may execute on more than one processor and the data connection to the remote subroutines may be maintained throughout the life of the procedure.

In accordance with the present invention, for the algorithm/dataform interaction the Glue Routine or subsystem performs the following functions:
1. Compacts the arguments, the descriptor and the information and facilitates the passing of that information to the dataforms and the algorithm.
2. Brings the algorithms and the dataforms into an execution state.
3. Opens lower level communication channels by interacting with the underlying (perhaps primitive) operating system so that communication between any of the two modules can take place.
4. Converts the low level communication mechanism to a higher level mechanism where read and write can be used.
5. Generates input subprocesses for the algorithm and the dataform so that communication requests are serviced and input data can be accepted synchronously. Note, each processor utilized in an algorithm or dataform may perform several subprocesses.
6. Generates output subprocesses for the algorithm and the dataform so that communication requests are serviced and output data can be sent synchronously.

The above steps are performed by the Glue Routines prior to the time when the user causes the program to run or execute. The subsequent steps 7, 8 and 9 are performed after the user enters the run command via keyboard 113 or via mouse 114.
7. Perform all of the above operations after the programs have started executing. That is, if a new interaction pattern is generated by the program itself, that can also be handled at run time.
8. Keep track of the state of all the processes generated in the system and signal completion of a phase of execution of the entire program.
9. Interact with rest of the present invention and computer system to affect or modify behavior at run time including servicing interrupts.

The above paragraphs describe the Glue Routine operations which occur during the create-source step 422. After the source program is created, it is compiled in step 424 on either workstation 110 and/or on CPU-1-CPUN in a distributed manner.

After the user-originated program has been compiled, it may be executed in step 426. During this step, if external parameters are needed to be entered as input to our illustrative program of FIG. 3, the user will enter them on-line via TTYIN. Using the previously-described tools the user can, illustratively, measure the performance of his or her program and/or animate the actual processing sequences. Subsequently, the user can modify or edit the program to improve the performance. Finally, after the user is satisfied with the performance, the user can down load the program to operate it in an extended environment which may include workstation 110 and/or any combination of the CPUs (i.e., CPU-1-CPUN).

What has been described is merely illustrative of the application of the principles of the present invention. For example, the parallelism factor in a dataform may be selected automatically depending upon the parallelism factor of the algorithm(s) it is connected to or vice-versa. Again, the parallelism factor for all modules may be determined by the system as a function of the performance feedback results the system obtains after the first executing of the application program. Also, the data type selection may be automated after the data types of the first few modules have been specified by the user. For programming efficiency reasons, an automatic compactor may be used to merge a dataform with either one of the algorithms it is connected to. Thus, other methods and embodiments can be implemented by those skilled in the art without departing from the spirit and scope of the present invention.

What is claimed is:

1. A method, carried out within a computer, for generating an application program for controlling a parallel processor apparatus, said application program composed of predefined modules selected from a database accessible by the computer in response to user inputs, the method comprising the steps of:

in response to user inputs entered on an input device connected to the computer, selecting and displaying, at the computer, a first number of parallel program modules, from a group of predefined parallel program modules, stored in the database, at least one selected program module having more than one processor as specified by a user-defined data structure;

in response to additional user inputs, selecting and displaying a second number of parallel program interface modules from a group of predefined parallel program interface modules, stored in the database, said second number equal to or exceeding said first number, each selected interface module being arranged in response to further user inputs for transforming distributed data in parallel form received from at most one selected program module into a distributed output data structure for output to at most one selected program module; and generating, at the computer, the program code for said application program using the program code of said selected program modules and said selected interface modules.

2. The method of claim 1 wherein the first selecting step includes variables, which are specified by user input information entered on an input device, including a data type for, a parallelism factor for, and a function to be performed by said at least one selected program module.

3. The method of claim 1 wherein at least one selected interface module includes user-specified information for specifying a parallelism factor therefor.

4. The method of claim 1 wherein at least one selected interface module includes a dataform module for transforming said input data structure into said output data structure, and glue means for establishing communication paths to enable said dataform module to accept said input data structure from at most one selected program module and to output data structure to at most one selected program module.

5. The method of claim 4 wherein at least one selected interface module includes a dataform module having an input data structure the same as its output data structure.

6. The method of claim 1 wherein said interface module selecting step includes the step of enabling the user to enter program code via an input device to create at least one selected interface module.

7. The method of claim 1 wherein said program module selecting step includes the step of enabling the user to enter program code via an input device to create at least one program module.

8. The method of claim 1 wherein at least one selected interface module includes an output interface module for outputting data from said application program via an output device accessible by the computer.

9. The method of claim 1 wherein at least one selected interface module includes an input interface module for receiving data input to said application program.

10. The method of claim 1 wherein at least one selected interface module includes a file interface module for outputting data to a file in a database accessible to the computer.

11. The method of claim 1 wherein at least one selected interface module includes a shared memory interface module for interfacing a shared memory of the computer to at least one program module.

12. The method of claim 1 wherein at least one selected interface module transforms the format of data inputted thereto into a different format for output therefrom.

13. The method of claim 1 wherein at least one selected program module includes an argument and a parameter variables which are specified in response to user inputs.

14. The method of claim 1 wherein at least one selected interface module includes an argument, a parameter and an input/output data number variables which are specified in response to user inputs.

15. The method of claim 1 wherein at least two of said selected interface modules accepts an input from the same program module of said selected program.

16. The method of claim 1 wherein at least two of said selected interface modules provide an output to the same program module of said selected modules.

17. The method of claim 1 further including the step of selecting, under user control, a tool module for evaluating the performance of said application program when an execution of said application program is initiated by said user.

18. A method, carried out within a computer, for generating a program for controlling a parallel processor apparatus comprising the steps of storing, in a database accessible by the computer, program code for a group of predefined parallel program modules and a group of predefined parallel program interface modules;

selecting for display, at a display accessible by the computer, under user control using an input device of the computer, at least one of said group of program modules arranged to operate using more than one processor as defined by a user input, and at least one of said group of interface modules;

attaching together, under user control using an input device of the computer, said at least one selected program module and said at least one selected interface module to compose a visual display of said program; and generating, at the computer, the program code for said program using the program code of said at least one selected program module and said at least one selected interface module, and program code generated by said computer to implement said attaching step.

19. The method of claim 18 further including, following said selecting step, the step of adapting, under using control, using an input device of the computer said at least one selected algorithm module and said at least one selected dataform module, to implement user-defined operating characteristics of said program.

20. Computer apparatus for generating an application program for controlling a parallel processor arrangement comprising means for storing the program code for a group of parallel program modules and a group of parallel program interface modules and controller means including first selection means for enabling a user to select, via an input device of the computer, a first number of said group of program modules, at least one selected program module having more than one processor as specified in response to user input;

second selection means for enabling a user to select a second number of said group of interface modules, said second number equal to or exceeding said first number, each selected interface module transforming an input data structure received from at most one selected program module into an output data structure for output to at most one selected program module and generating means for generating application program code using the program code of said selected program module and said selected interface module.

21. The apparatus of claim 20 wherein at least one selected program module includes user-specified information for specifying a data type for, a parallelism factor for, and a function to be performed by said at least one selected program module.

22. The apparatus of claim 20 wherein at least one selected interface module includes user-specified information for specifying a parallelism factor therefor.

23. The apparatus of claim 20 wherein at least one selected interface module includes a dataform module for transforming said input data structure into said output data structure, and glue means for establishing communication paths to enable said dataform module to accept said input data structure from at most one selected program module and to output said output data structure to at most one selected program module.

24. The apparatus of claim 20 wherein at least one selected interface module includes a dataform module having an input data structure the same as its output data structure.

25. The apparatus of claim 20 further including means for selecting, under user control, a tool module for evaluating the performance of said application program when an execution of said application program is initialed by said user.

26. Computer apparatus for generating an application program for controlling a parallel processor arrangement, said apparatus comprising means for storing program code for a group of predefined parallel program modules and a group of predefined parallel program interface modules;

means for selecting, under user control, using an input device of said apparatus, at least one of said group of program modules and at least one of said group of interface modules, at least one selected program module having multiple processors selected under user control;

means for attaching together, specified under user control, using an input device of said apparatus said at least one selected program module and said at least one selected interface module to construct said program; and means for generating the program code for said program using the program code of said at least one selected program module and said at least one selected interface module, and program code generated by said apparatus to implement an attaching function specified for said attaching means by said user.

27. The apparatus of claim 26 further comprising means for adapting, under user control, said at least one selected program module and said at least one selected interface module, to implement a user-defined operating characteristic of said program.

28. Computer apparatus for generating an application program for controlling a parallel processor arrangement comprising first selection means for enabling a user to select, using an input device of the computer, a first number of a predefined group of program modules, at least one selected program module having more than one processor as specified by a user-defined data structure, second selection means for enabling a user to select, using an input device of the computer, a second number of a predefined group of interface modules, said second number equal to or exceeding said first number, each selected interface module arranged to transform an input data structure received from at most one said selected program module into an output data structure for output to at most one selected program module and generating means for generating application program code using the program code of said selected program module and said selected interface module.

29. The apparatus of claim 28 wherein at least one selected interface module includes a dataform module for transforming said input data structure into said output data structure, and glue means for establishing communication paths to enable said dataform module to accept said input data structure from at most one selected program module and to output said output data structure to at most one selected program module.

* * * * *